United States Patent
Barois et al.

(10) Patent No.: US 11,916,814 B2
(45) Date of Patent: Feb. 27, 2024

(54) METHOD FOR TRANSMISSION IN AN EXTENDED BAND BETWEEN TWO NEIGHBOURING DEVICES OF A NETWORK

(71) Applicant: SAGEMCOM ENERGY & TELECOM SAS, Rueil Malmaison (FR)

(72) Inventors: Jérôme Barois, Rueil Malmaison (FR); Julien Barthes, Rueil Malmaison (FR); Clément Terrien, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 132 days.

(21) Appl. No.: 17/355,628

(22) Filed: Jun. 23, 2021

(65) Prior Publication Data

US 2022/0006578 A1 Jan. 6, 2022

(30) Foreign Application Priority Data

Jul. 1, 2020 (FR) ....................................... 2006945

(51) Int. Cl.
*H04B 3/54* (2006.01)
*H04L 5/00* (2006.01)
*H04L 1/00* (2006.01)

(52) U.S. Cl.
CPC ............ *H04L 5/0007* (2013.01); *H04B 3/54* (2013.01); *H04L 1/0071* (2013.01)

(58) Field of Classification Search
CPC .. H04B 3/54; H04B 3/542; H04B 2203/5404; H04B 2203/5408
See application file for complete search history.

(56) References Cited

U.S. PATENT DOCUMENTS

| 2009/0110096 A1* | 4/2009 | Koga ........................ H04L 5/06 375/260 |
| 2012/0134395 A1 | 5/2012 | Varadarajan et al. |

(Continued)

FOREIGN PATENT DOCUMENTS

| CN | 109039378 A | 12/2018 |
| CN | 111030956 A * | 4/2020 ............... H04B 3/54 |

(Continued)

OTHER PUBLICATIONS

Feb. 16, 2021 Search Report issued in French Patent Application No. 2006945.

*Primary Examiner* — Kevin Kim
(74) *Attorney, Agent, or Firm* — Williams Mullen; R. Brian Drozd

(57) ABSTRACT

A method for transmitting data in a power line communication network, the method being executed in a network node device configured so as to communicate in a plurality of separate frequency bands with a second network node device, the method comprising steps for selecting a transmission mode for transmitting in a frequency band called "extended frequency band" comprising at least two separate frequency bands chosen from among the plurality of separate frequency bands; distributing data to be transmitted in the extended frequency band into a plurality of groups of data, each group being assigned to just one of the at least two separate frequency bands; and transmitting the data in each of the plurality of groups of data in the separate frequency band to which the group is assigned, the step for distributing the data being carried out by a data interleaver.

9 Claims, 7 Drawing Sheets

(56) References Cited

U.S. PATENT DOCUMENTS

2014/0105313 A1    4/2014  Kim et al.
2016/0127056 A1*   5/2016  Soman ................. H04L 1/0045
                                                   370/463

FOREIGN PATENT DOCUMENTS

EP            3104569 A1     12/2016
WO     WO-2021168706 A1 *     9/2021

* cited by examiner

METHOD FOR TRANSMISSION IN AN EXTENDED BAND BETWEEN TWO NEIGHBOURING DEVICES OF A NETWORK

TECHNICAL FIELD

At least one embodiment of the present invention relates to a method for transmitting a message from a first node device to a second node device belonging to a network neighbourhood of the first node device, said first and second node devices belonging to a network using power line communications. At least one embodiment of the present invention relates to a device implementing the method.

PRIOR ART

Power line communications (PLC) are becoming more widespread, in particular in the context of AMM (abbreviation for "Automated Meter Management") electricity supply networks. Communication networks are thus implemented in electricity supply networks in order for a base node device (also called "data hub") of the network to automatically collect, from smart electricity meters, energy consumption reading data that said smart electricity meters are respectively responsible for monitoring.

The G3-PLC communication standard is defined so as to allow the various node devices (in particular data hub and smart electricity meters) of such a network to communicate with one another. The standard is specified in the ITU-T G.9903 recommendation, which describes in particular the physical layer (PHY) and the data link layer (DLL) of the OSI (acronym for "Open Systems Interconnection") model. The G3-PLC standard is intended to be used in frequency bands ranging from 10 to 490 kHz. More specifically, it supports the following frequency bands: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of data rate, range, and resistance to interfering factors in particular.

However, the G3-PLC standard permits the use of only one of said frequency bands for a given node device. More precisely, modern node devices may sometimes support a plurality of frequency bands, but not at the same time. A reconfiguration is then required in order to change from a first frequency band to a second frequency band. Thus, when, in a communication network, it is necessary to reconfigure a set of data hub devices and a set of electricity meters associated therewith in a new frequency band, a reconfiguration may prove to be particularly complex. For example, a meter device that has not been able to receive a message telling it to change frequency band may become incapable of communicating with the data hub device with which it is associated after the latter has for its part been able to change frequency band.

However, the needs in terms of resources of communication networks, in particular in the deployment of AMM electricity supply networks, are increasing on a daily basis. The frequency band for which the elements forming a network have been certified may be at a capacity limit, thereby forming an obstacle to increasing the number of exchanges in the network, for example in order to introduce new functionalities or even new application needs, for example.

It is desirable to overcome these various drawbacks from the prior art. It is thus desirable in particular to propose a power line communication-based solution that makes it possible to increase the capacity for the number of exchanges in the communication network. It is in particular desirable to propose a solution that is applicable to AMM electricity supply networks.

SUMMARY OF THE INVENTION

To this end, one subject of the invention is a method for transmitting data in a power line communication network, the method being executed in a first node device of the network configured so as to communicate in a plurality of separate frequency bands with a second node device of the network, the method being such that the first node device applies a transmission mode for transmitting in a frequency band called "extended frequency band", the extended frequency band comprising at least two frequency bands from among said plurality of separate frequency bands, each separate frequency band comprising a plurality of subcarriers, and the method comprising the following steps:
distributing data to be transmitted in the extended frequency band into a plurality of groups of data via an interleaving operation, each group being assigned to just one of the at least two separate frequency bands, and data in each of the groups being assigned to each of the subcarriers of the frequency band to which the group is assigned,
transmitting the data in each of the plurality of groups of data in the separate frequency band to which the group is assigned such that the data transmission is carried out jointly on all of the subcarriers of the at least two frequency bands.

The term "separate frequency band" in this case denotes a frequency band separate from another frequency band.

Advantageously, it is thus possible to use a plurality of frequency bands simultaneously while at the same time addressing the hardware means that are used by referring to an extended frequency band, in a manner similar to what is performed for communications in a single frequency band.

The advantages stemming from simultaneous use of a plurality of frequency bands are for example increasing the average speed of transmissions between two neighbouring nodes, and therefore more broadly through the communication network, optimized distribution of the load of the network over a plurality of frequency bands, and better communication in an environment subjected to interference.

The advantages stemming from addressing a single frequency band, that is to say the extended band that comprises a plurality of separate frequency bands, lie in the simplification of the management of interference. It is thus possible to overcome any temporal interference (starting up of an apparatus, for example) or frequency interference (presence of electromagnetic interference only at some frequencies).

The method according to the invention may also comprise the following features, considered on their own or in combination:
The at least two separate frequency bands are chosen from among the following group: CENELEC A frequency band, CENELEC B frequency band, and FCC frequency band or ARIB frequency band.
The abovementioned data interleaving operation comprises:
i) obtaining a first interleaving table T [m, n] of bits representative of the data to be transmitted, the first table comprising the same number of second interleaving tables Ti [$m_i$, $n_i$] of bits as there are separate frequency bands contained in the extended band, each second interleaving table Ti [$m_i$, $n_i$] being assigned to just one of the at least two separate frequency bands of the extended frequency band, the dimensions $m_i$, $n_i$ of each of the second interleaving tables Ti [$m_i$, $n_i$] being defined in accordance with a modulation type used for the transmission of the data in the separate frequency band to which a second interleaving table is assigned, any differences in dimensions between second interleaving tables being liable to generate one or more positions that are said to be invalid, contained in the first interleaving table but not contained in at least one of the second interleaving tables, ii) interleaving the bits by successively shifting the rows m and columns n of the first interleaving table T [m, n], the successive shifts being performed in the form of circular permutations of the bits respectively by row and by column, iii) moving any bit detected as being present at an invalid position of the first interleaving table to a position of a said second interleaving table that is available following the interleaving of the bits of the first interleaving table, such that each second interleaving table comprises bits assigned to one of said groups of data, iv) directing the bits of each of the groups of data to electronic circuitry configured so as to modulate and transmit said bits.

Step ii) for interleaving the bits and the dimensions of the second interleaving tables are in accordance with the ITU-T G.9903 recommendation.

The power line communication network is a meshed G3-PLC network.

Another subject of the invention is to propose a node device intended to be used in a power line communication network, the node device being configured so as to communicate in a plurality of separate frequency bands with a second node device of the network and so as to apply a transmission mode for transmitting in a frequency band called "extended frequency band", the extended frequency band comprising at least two frequency bands from among the plurality of separate frequency bands, each separate frequency band comprising a plurality of subcarriers, the node device comprising electronic circuitry configured so as to:

distribute data to be transmitted in the extended frequency band into a plurality of groups of data via an interleaving operation, each group being assigned to just one of said at least two separate frequency bands, and data in each of the groups being assigned to each of the subcarriers of the frequency band to which the group is assigned, transmit the data in each of the plurality of groups of data in the separate frequency band to which the group is assigned such that the data transmission is carried out jointly on all of the subcarriers of the at least two frequency bands.

Advantageously, the at least two separate frequency bands in which the node device is able to communicate are chosen from among the following group: CENELEC A frequency band, CENELEC B frequency band, and FCC frequency band or ARIB frequency band, and the dimensions of the second interleaving tables are in accordance with the ITU-T G.9903 recommendation.

Another subject of the invention is a power line communication network comprising a plurality of node devices as described above.

Another subject of the invention is a computer program product comprising program code instructions for executing the steps of the method described above when the program is executed by a processor, and also an information storage medium comprising a computer program product according to the preceding claim.

BRIEF DESCRIPTION OF THE DRAWINGS

The abovementioned features of the invention, and others, will become more clearly apparent on reading the following description of at least one exemplary embodiment, said description being given with reference to the appended drawings, in which.

DETAILED DESCRIPTION OF EMBODIMENTS

Figure 1:
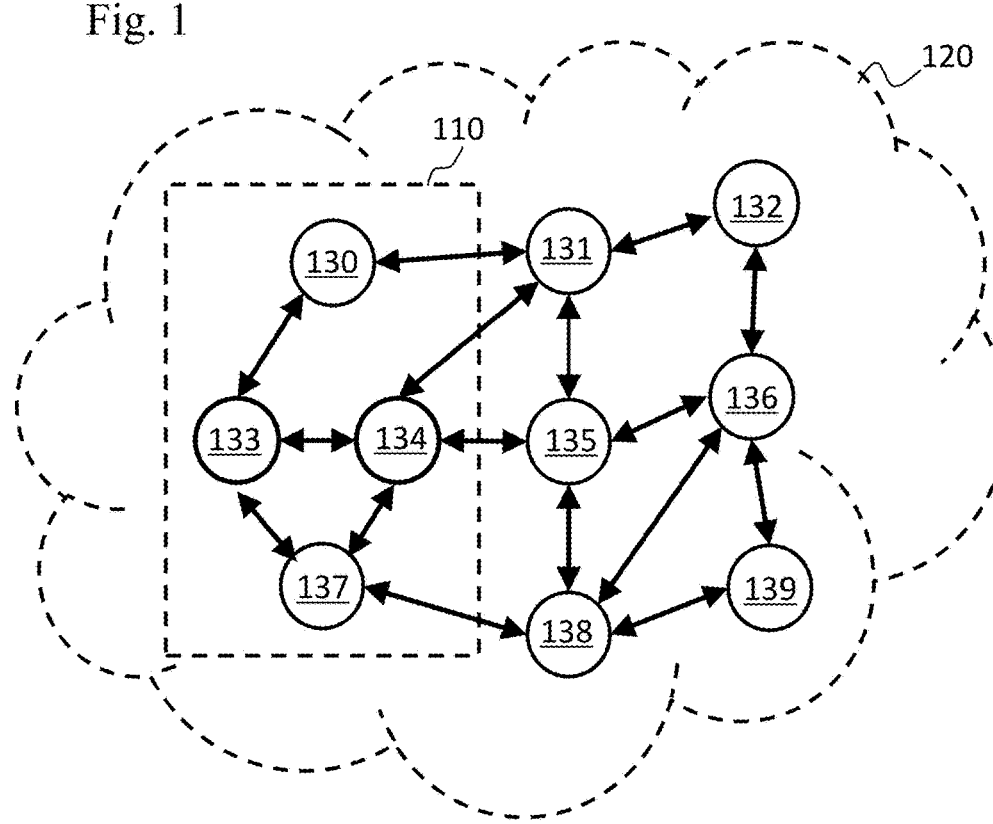
FIG. 1 illustrates an electricity supply network using power line communications.

FIG. 1 schematically illustrates a communication network 120. The communication network 120 is based on power line communications PLC. The communication network 120 is for example an AMM electricity supply network allowing a base node device (also called "data hub") to collect, from smart electricity meters, energy consumption reading data for electrical installations that said smart electricity meters are respectively responsible for monitoring. The data hub and the smart electricity meters are thus node devices of the communication network 120. The communication network 120 may comprise other node devices, for example installed in electrical transformers.

The communication network 120 has a meshed structure. The meshed structure of the communication network 120 is shown schematically in FIG. 1 through arrows representing the communication links between two neighbouring nodes, and in which some node devices act as a relay so as to increase the communication range in the communication network 120. One and the same smart electricity meter thus potentially has a plurality of routes for reaching the data hub, and vice versa.

The present invention is therefore particularly suited to the context of G3-PLC technology. The communication network 120 thus comprises a plurality of node devices 130, 131, 132, 133, 134, 135, 136, 137, 138, 139. A network neighbourhood is associated with each of the node devices of the communication network 120. For example, the node device 133 in FIG. 1 is associated with a network neighbourhood 110 incorporating the node devices 130, 134 and 137. In the communication network 120, a signal or a message broadcast by a node device, such as, for example, the node device 133, is not generally visible at any point of the communication network 120. Each node device transmitting signals or messages then has a network neighbourhood, that is to say a subset of the communication network 120, in which any node device is able to intelligibly receive the signals or messages directly from the node device that broadcast these signals or messages. The network neighbourhood corresponds to the range of the transmitted signals, depending on predetermined transmission parameters (for example power, modulation and coding scheme, network topology, etc.) of the node device at the source of the signals and also potentially depending on characteristics of the communication channel, such as for example an attenuation, a noise level or an impedance.

The communication network 120 is based on a reactive routing protocol, such as for example the LOADng ("Lightweight On-demand Ad hoc Distance-vector Routing Protocol—Next Generation protocol"). In contrast to proactive routing protocols, which are based on overall network topology knowledge, reactive routing protocols are based on on-demand route discoveries, each node device of the network then needing only to know its own network neighbourhood in order to route data in the communication network 120.

To discover an appropriate route in the communication network 120 from a source node device (for example the node device 133) to a destination node device (for example the node device 132), it is known that the source node device broadcasts a discovery request, called RREQ ("Route REQuest"). This route discovery request is received by each node device in the network neighbourhood of said source node device. Each node device in the network neighbourhood of said source node device relays said copy of the request through broadcasting if said node device in question is not the destination node device. Through step-by-step broadcasting, a plurality of copies of the route discovery request are typically received by the destination node device, each of these copies having taken a different path in the communication network 120.

The use of routing tables stored in the node devices makes it possible to perform point-to-point or unicast communications between any pair of node devices of the communication network 120. Intermediate node devices therefore serve as a relay when the node devices of said pair are not in the network neighbourhood of one another, and the communications thus take place step-by-step, each node device using one of its own neighbours to track messages to their respective intended recipients.

For communication between neighbouring node devices (that is to say node devices that are in the network neighbourhood of one another), the messages are transmitted in the form of modulated frames. When a modulated frame is addressed specifically to a neighbouring node device and it is demodulated correctly thereby, said neighbouring node device retransmits an acknowledgement ACK to the node device that addressed said modulated frame thereto. The acknowledgement ACK is transmitted on the same frequency band as the modulated frame with which said acknowledgement ACK is associated.

A plurality of frequency bands are defined in order to support the transmission of these modulated frames, an appropriate modulation scheme being associated with each of these frequency bands. Each frame transmitted in the form of modulated signals begins with a predefined preamble depending on the modulation scheme in accordance with which said signals were modulated. The preamble is designed to make it possible to perform synchronization at reception on said frame, that is to say to be able to determine an effective frame start time. To this end, the preamble typically comprises a plurality of successive copies of one and the same symbol. The effective content and the duration of the preamble are thus predefined and depend on the modulation scheme that is used. The preambles of a plurality of frames are identical when the same modulation scheme is applied, and differ if not.

The applicable modulation schemes (and corresponding demodulation schemes) are preferably OFDM ("Orthogonal Frequency Division Multiplex") multi-carrier modulation schemes (respectively demodulation schemes).

In terms of frequency bands able to be used in the context of implementing the communication network 120, mention may be made of the following: the CENELEC A frequency band, which ranges approximately from 35 kHz to 91 kHz: the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. It is then possible to use: a first modulation scheme with thirty-six carriers in the CENELEC A frequency band; a second modulation scheme with seventy-two carriers in the FCC frequency band; a third modulation scheme with fifty-four carriers in the ARIB frequency band; and a fourth modulation scheme with sixteen carriers in the CENELEC B frequency band. It is apparent from the above that a node device may simultaneously use a plurality of separate frequency bands to communicate with one or more of its neighbours by applying an appropriate transmission mechanism. However, it appears that the ARIB and FFC frequency bands cannot be used simultaneously by one and the same node device, given that they overlap.

Advantageously, at least some of the node devices 130, 131, 132, 133, 134, 135, 136, 137, 138, 139 are configured so as to communicate in a plurality of separate frequency bands. It is therefore important, for a given node device, to be able to determine which communication modes are supported by a node device in its network neighbourhood. The term "supported communication modes" denotes one or more native communication modes of a node device, that is to say that said node device is capable of implementing due to its possible configurations, and also means that these one or more native communication modes are able to be used at a given time, given the possible interference that may exist. The interference may originate for example from a noisy environment.

A message exchange in accordance with a predefined protocol for example allows a first node device to obtain information with regard to the communication capabilities of a neighbouring second node device. For example, the first node device addresses to the neighbouring second node device a copy of a first message in each of the frequency bands in which it is able to communicate due to its configuration, and the neighbouring node device is configured so as to recognize such a message and to respond thereto through a second message in each of the frequency bands in which it was able to receive it.

In a G3-PLC context, for example, the copies of the first message contain information according to which a channel estimate is requested from the neighbouring node device, for the frequency band in which it received the message (called "Tone Map" request). Advantageously, the information according to which a channel estimate is requested from the neighbouring second node device by the first node device is then a Tone Map Request indicator of a frame control header defined in accordance with the ITU-T G9903 recommendation. The neighbouring second node device will thus respond to the Tone Map Request request by sending, to the first node device, in each of the frequency bands in which it received a copy of the first message, a second message comprising information representative of at least one channel estimate in the form of a Tone Map Request data block as defined in accordance with the ITU-T G9903 recommendation.

The first device may therefore ascertain and store information with regard to the frequency bands that it is able to use to communicate with the neighbouring second node device.

According to one embodiment of the invention, at least some of the node devices 130, 131, 132, 133, 134, 135, 136, 137, 138, 139 supporting communication modes for communicating in a plurality of separate frequency bands also support a communication mode for communicating in a frequency band called "extended frequency band". An extended frequency band advantageously comprises a plurality of separate frequency bands. An extended frequency band may thus comprise two, three or four separate frequency bands, for example, or even more. Each separate frequency band uses a plurality of subcarriers.

Determining the capability of a neighbouring node device to communicate in an extended frequency band is similar to what is described above for determining the various communication modes supported by a device, considering that the extended frequency band is commonly defined between the various neighbouring node devices of the communication network. Thus, according to one embodiment, the extended frequency band may be defined as comprising the CENELEC A frequency band, the CENELEC B frequency band and the FCC band. According to one variant, the extended frequency band may be defined as comprising the CENELEC A frequency band, the CENELEC B frequency band and the ARIB band. A first node device may therefore transmit a channel estimate request (called "TONE MAP" request) in the extended frequency band in order to determine whether a neighbouring second node device supports communications in the extended frequency band.

Figure 2:
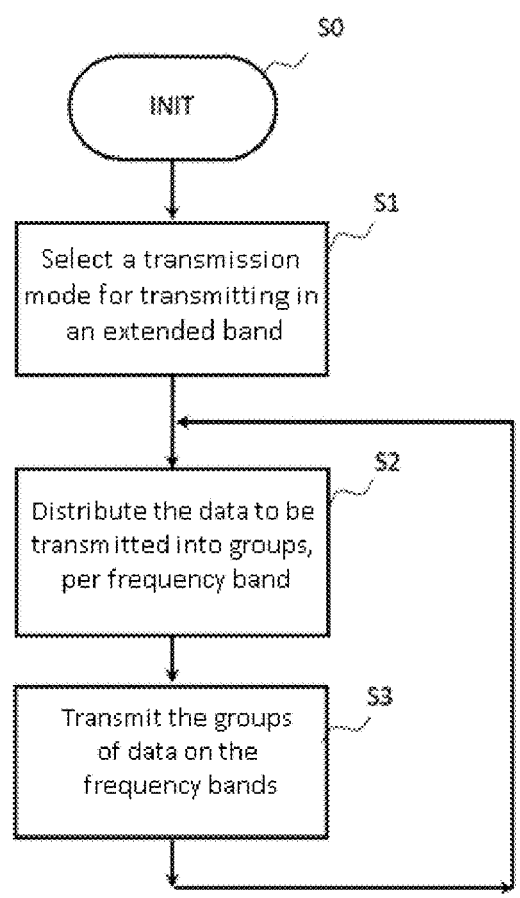
FIG. 2 is a flowchart illustrating a method for transmission in the network represented in FIG. 1, according to one embodiment.

FIG. 2 illustrates a method for transmission in an extended frequency band according to one embodiment. The illustrated method is executed in one, the first, of the node devices of the communication network 120, configured so as to support a transmission mode for transmitting in an extended frequency band, and which communicates with a neighbouring second node device, which is itself also configured so as to communicate in an extended frequency band. The first node device in which the method is executed is for example the node device 133 that communicates with the neighbouring second node device 134.

At the end of an initialization step S0, the first and second node devices 133 and 134 are configured so as to communicate with one another in at least one communication mode for communicating in at least one frequency band. It is considered that the devices are then normally operational, at this stage, and that a message exchange may be initiated.

According to one embodiment, the first node device 133 is configured, in a step S1, so as to implement communications in an extended frequency band. This configuration is achieved for example through writing of an extended frequency band validation indicator by a control module of the first node device 133. According to one embodiment, this indicator is a bit set to "1" in a configuration register of the node device 133 that controls interleaving of data to be transmitted in an interleaving mode specific to a transmission in an extended frequency band.

The configuration of the first node device 133 in a communication mode for communicating in an extended frequency band may be performed for example after the first node device 133 has addressed a channel estimate request, said request comprises an indicator according to which an extended frequency band is involved in this request, and the second node device 134 has then responded to this request by telling the first node device 133 that it is indeed compatible with communication in an extended frequency band. The neighbouring second node device 134 for example responds in the form of a message containing information representative of a channel estimate, on each of the frequency bands contained in the extended frequency band as defined by the first node device 133.

According to one variant, the first node device 133 is natively designed to implement communications in an extended frequency band, such as the frequency band defined in the present description, and no specific configuration of the first node device 133 is required after an initialization phase following turning on.

It is thus considered that the node device 133 is configured so as to communicate in an extended frequency band at the end of initialization step S0 and applies a communication mode for communicating in an extended frequency band, whether this required specific configuration (selection of a communication mode, for example) or whether this configuration is native, that is to say inherent to the design of the first node device 133 and to the various electronic circuits forming it.

Of course, the first node device 133 is configured so as to implement any message or protocol signal exchange intended to organize and manage the sharing of the network with other node devices. Such exchanges are thus intended to request access to the network, or else to record information relating to the communication capabilities of the neighbouring node devices, such as the second node device 134 for example.

The data to be transmitted in an extended frequency band are distributed into each of the separate frequency bands of the defined extended band in a step S2. In this step S2, the data are distributed into various groups of data. The data in each of the various groups are intended to be transmitted in a single frequency band assigned to the group. It is considered here, indiscriminately, that a group of data is assigned to just one of the frequency bands contained in the extended frequency band, or vice versa. According to one embodiment, the distributed groups of data are sets of bits $b1$, $b2$, $b3$, $b4$, . . . , $bi$, . . . $bn$ originating from a serial flow of bits. For example, the data thus presented in the form of a serial flow originate from a convolutional encoder, such as a Viterbi encoder.

Advantageously, the data to be transmitted in an extended frequency band are distributed into a plurality of groups during a step of interleaving the data. The step of interleaving the data is performed by what is called "interleaver" circuitry. According to one embodiment, the interleaving is advantageously performed based on an input interleaving table comprising a plurality of output interleaving tables, as explained further on in the present description.

After the described interleaving is performed in the first node device 133, the data grouped together (distributed) into the same number of output interleaving tables of the interleaver as there are separate frequency bands contained in the extended frequency band are addressed to modulators of the first node device 133 each operating in one of the various separate frequency bands. The data are thus transmitted to the neighbouring second node device 134 in parallel and simultaneously by the various modulators of the first node device 133.

The second node device 134, configured so as to receive the data in an extended band, that is to say simultaneously in the same separate frequency bands as those used for the transmission, operates in the inverse manner. In other words, the second node device 134 demodulates the data received in each of the separate frequency bands, de-interleaves the data in an inverse manner to what is performed by the interleaver of the first node device 133, and then delivers a serial flow of bits to a Viterbi decoder, where applicable, of the second node device 134.

The flowchart of FIG. 2 looping back to the start of step S2 illustrates processing continuity between successive data interleaving operations in step S2 and the transmission of these same data distributed into groups in an extended frequency band in step S3, that is to say in parallel on a plurality of separate frequency bands and jointly using all of the subcarriers of each of the separate frequency bands of the extended band. The flow of bits at the input of the interleaver is thus processed in successive portions of bits. While the bits are being interleaved, previously interleaved bits are transmitted by the modulators.

According to one embodiment, in the event of a transmission problem, the first node device 133 may be reconfigured into a communication mode other than a communication mode for communicating in an extended band, or else may transmit via a neighbouring node device other than the neighbouring second node device 134. The various steps of determining the quality of the transmission and/or reconfiguring the first node device 133 are not shown in FIG. 2 as they are not useful to the understanding of the invention.

As indicated, the data to be transmitted in an extended frequency band are cleverly distributed during an interleaving operation so as in particular to simplify the adaptation of existing node devices to support transmission in an extended frequency band.

Figure 3:
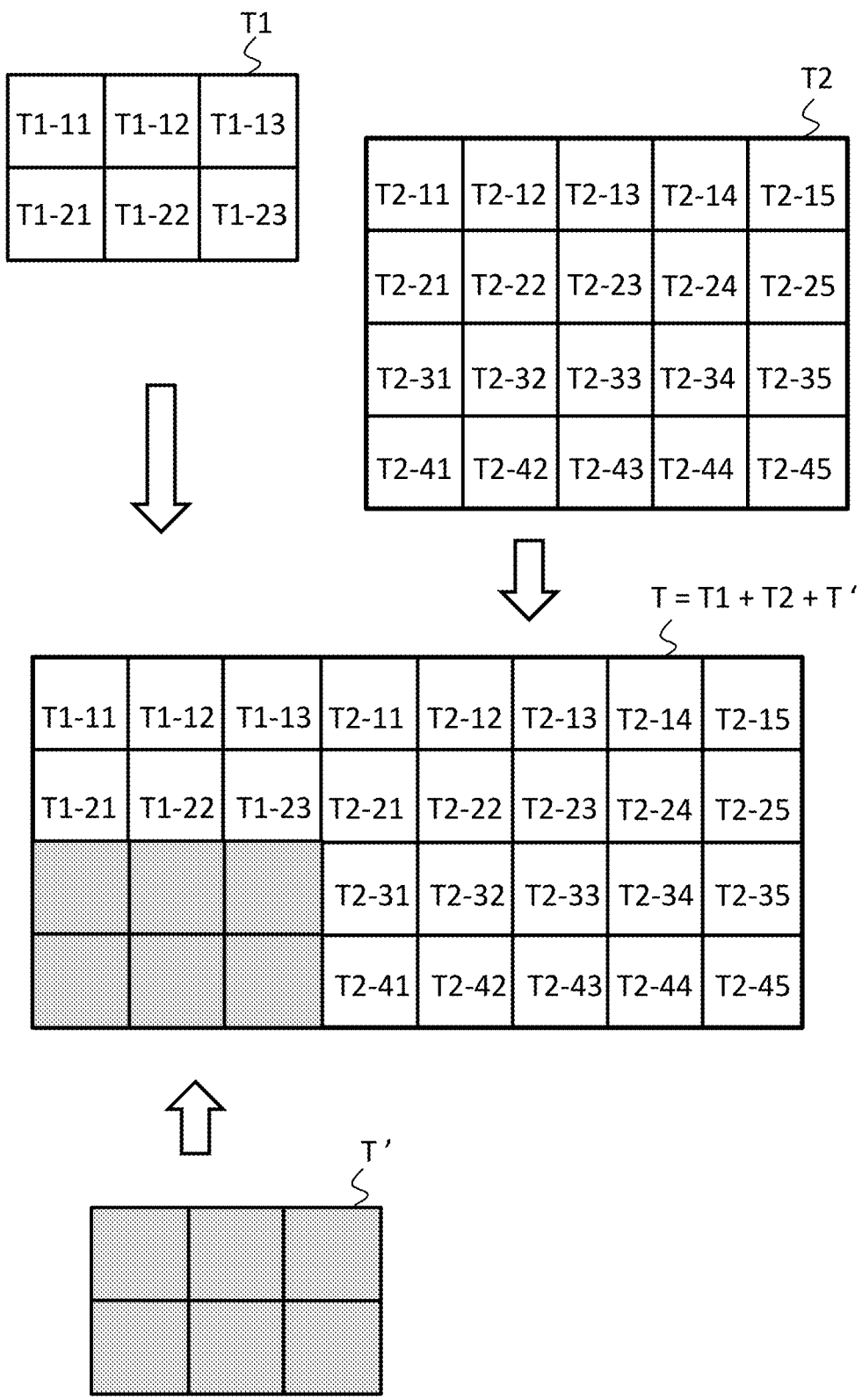
FIG. 3 illustrates the generation of a first data interleaving table used by the transmission method illustrated in FIG. 2, based on second interleaving tables, according to one embodiment.

FIG. 3 illustrates a first interleaving table T obtained from the concatenation of second interleaving tables T1 and T2. The first interleaving table T is the input table of the interleaver used by the transmission method described in FIG. 2, and the interleaving tables T1 and T2 are output tables of the interleaver that are used for the transmission of the groups of data distributed to the various modulators through the executed method. In the example described, two modulators are used to transmit the data in two separate frequency bands of the extended frequency band as defined.

Cleverly, the interleaving tables T1 and T2 have respective dimensions (number of rows $m_i$ and columns $n_i$) that are defined based on the modulation types used in each of the separate frequency bands of the extended frequency band. According to one embodiment, a first modulator uses a BPSK (abbreviation for "Binary Phase Shift Keying") modulation for the first frequency band and a second modulator uses a QPSK (abbreviation for "Quadrature Phase Shift Keying") modulation. The interleaving table T1 thus corresponds to an interleaving table as defined for example in accordance with the G3-PLC standard for a BPSK modulation, and its dimensions are defined by 2 rows and 3 columns. Similarly, the interleaving table T2 corresponds to an interleaving table as defined for example in accordance with the G3-PLC standard for a QPSK modulation, and its dimensions are defined by 4 rows and 5 columns. According to the G3-PLC standard, the dimensions of an interleaving table are defined such that the number of columns is equal to the number of subcarriers used in the frequency band used to transmit the data, and the number of rows depends on the number of bits to be interleaved. This number of bits to be interleaved is therefore determined according to the number of bits coded by a symbol depending on the modulation type used, and by the number of subcarriers used to transmit the symbols.

Cleverly, according to the exemplary definition of the first interleaving table T, the first interleaving table T is obtained by concatenating the second interleaving tables T1 and T2 that would be used for interleaving the data with a view to transmission in a single separate frequency band, respectively in BPSK mode for the second interleaving table T1 and in QPSK mode for the second interleaving table T2. Indices T1-11 to T1-13 symbolize the various positions of the first row of the second interleaving table T1, and indices T1-21 to T1-23 symbolize the various positions of the second row of the second interleaving table T1. In the same way, indices T2-11 to T2-15 symbolize the various positions of the first row of the second interleaving table T2, indices T2-21 to T2-25 symbolize the various positions of the second row of the second interleaving table T2, indices T2-31 to T2-35 symbolize the various positions of the third row of the second interleaving table T2 and indices T2-41 to T2-45 symbolize the various positions of the fourth row of the second interleaving table T2. Thus, more generally, an index Ti [$m_i,n_i$] in the present description symbolizes a position at the $m^{th}$ row and the $n^{th}$ column of the table Ti. The abovementioned indices are inserted into the various positions of the interleaving table T obtained by concatenating the interleaving tables T1 and T2 in FIG. 3 in order to better illustrate the concatenation mode that is used. According to one embodiment, the second interleaving tables T1 and T2 are concatenated such that the table whose columns correspond to the lowest-frequency subcarrier bands is situated on the left. The second interleaving tables T1 and T2 are concatenated so as to define the first table T by matching the first row of the second interleaving table T1 to the first row of the second interleaving table T2, and then the second row of the second interleaving table T1 to the second row of the second interleaving table T2. The definition of the first interleaving table T thus corresponds to the addition of the second interleaving table T1 and of the second interleaving table T2 plus a third interleaving table T', such that the first interleaving table T has the same number of positions in each of its columns and in each of its rows. In order to simplify the interleaving operations according to the described embodiment, the positions contained in the table T', contained in the first interleaving table T but not contained in at least one of the second interleaving tables T1 and T2, are said to be "invalid" since, after interleaving performed in the first interleaving table T, some data (bits) could be moved into one of these positions.

Specifically, an interleaving operation in an interleaving table usually consists in shifting the content of each of the rows and columns a certain number of times through circular permutations of the bits contained in the positions of the table. Each row is conventionally shifted a number of times different from the other rows and each column is conventionally shifted a number of times different from the other columns.

Figure 4:
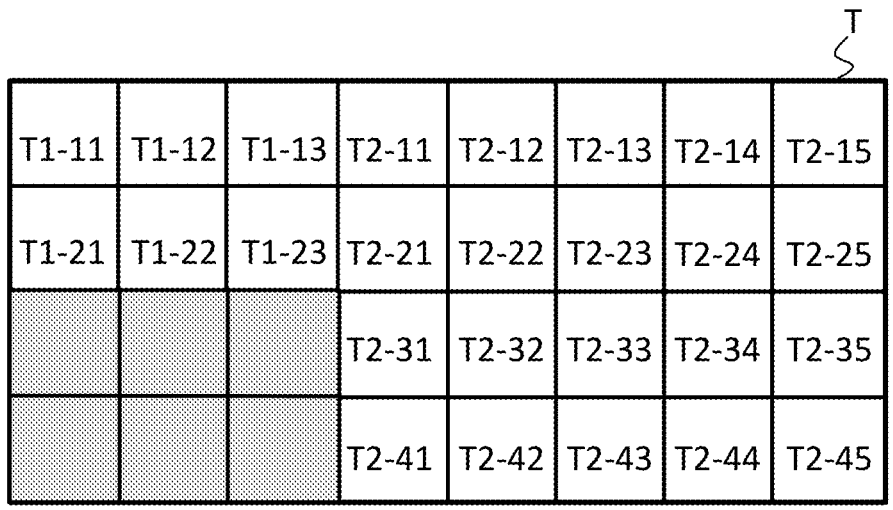
FIG. 4 illustrates the positions of the first interleaving table of FIG. 3 with specific references, according to one embodiment.
Figure 4:
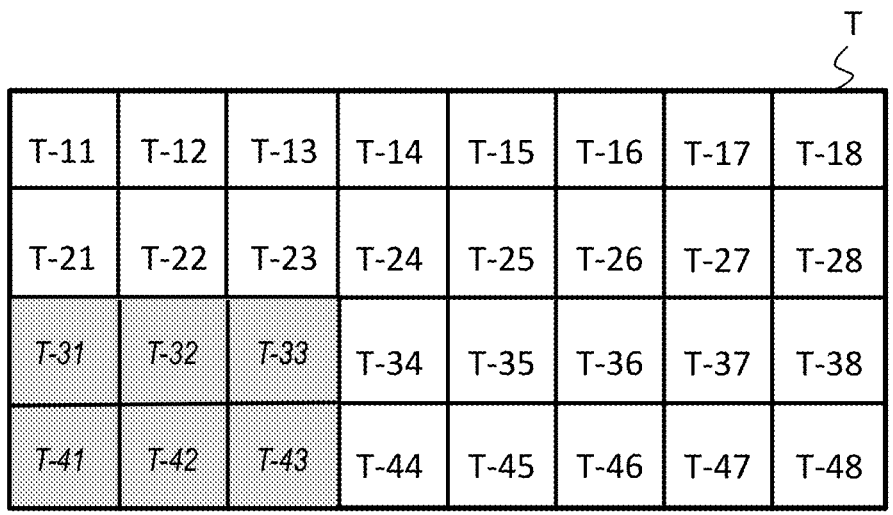

FIG. 4 illustrates the correspondence of the indices specific to identification of the positions in the first interleaving table T with the indices specific to identification of the positions in each of the second interleaving tables T1 and T2, or invalid positions in the table T'. Thus, for example, the position T1-11 in the second interleaving table T1 corresponds to the position T-11 in the first interleaving table T, and the position T2-32 in the second interleaving table T2 corresponds to the position T-35 in the first interleaving table T, thereby making it possible to gain a good understanding as to how the positions are respectively identified according to whether they refer to the first interleaving table T, obtained through concatenation, or to one of the second interleaving tables T1 and T2 defined on the basis of a type of modulation used in a separate frequency band.

The positions T-31, T-32, T-33, T-41, T-42 and T-43 are invalid positions in the first interleaving table T.

Figure 5:
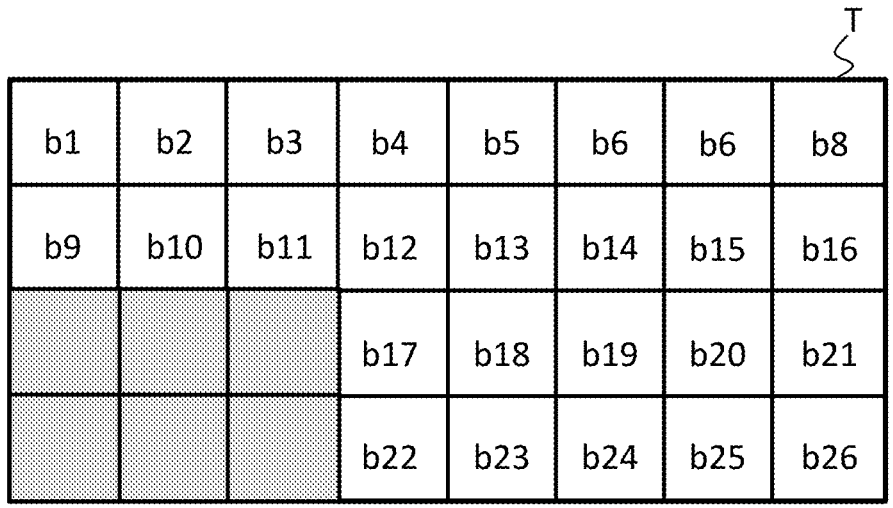
FIG. 5 illustrates an interleaving operation in the first interleaving table already shown in FIG. 3 and FIG. 4, according to one embodiment.
Figure 5:
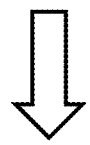
Figure 5:
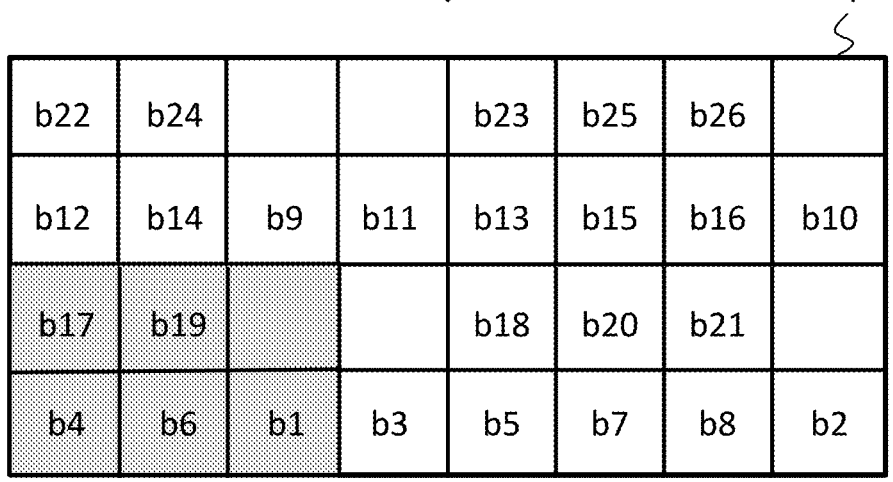

FIG. 5 illustrates the interleaving operation performed in the first interleaving table T by the transmission method according to the invention. The upper part of the figure shows the first interleaving table T defined prior to the interleaving, such that each of the positions in the interleaving table T that is not invalid contains a bit originating from the flow of bits to be interleaved (provided for example at the output of a convolutional encoder). Bits b1 to b26 of the flow of bits are "loaded" from left to right and from top to bottom into the first interleaving table T such that invalid positions are ignored. Bit b1 is loaded into the position T-11, b2 is loaded into the position T-12, . . . b13 into the position T-25, . . . and b26 into the position T-48. The invalid positions T-31, T-32, T-33, T-41, T-42 and T-43 of the first interleaving table T are ignored for the loading of the bits b1 to b26. The first interleaving table T is thus obtained, comprising the second interleaving tables T1 and T2, ready for an interleaving operation intended to distribute the loaded data (bits) into a plurality of groups of data each assigned to a separate frequency band. The interleaving operation per se is not described in FIG. 5, but is symbolized by an arrow leading from the depiction of the state of the first interleaving table T prior to the interleaving to the depiction of the state of the first interleaving table T following the interleaving. The lower part of FIG. 5 thus shows the first interleaving table T after the overall interleaving operation. Bit b22 occupies the position occupied by bit b1 before the interleaving, bit b24 occupies the position occupied by bit b2 before the interleaving, bit b23 occupies the position occupied by bit b5 before the interleaving, etc., and so on. Since the interleaving was performed in whole rows and columns of the first interleaving table T, this means that invalid positions may contain bits following the interleaving. According to the embodiment, these bits are then moved to valid positions of the first interleaving table T.

Figure 6:
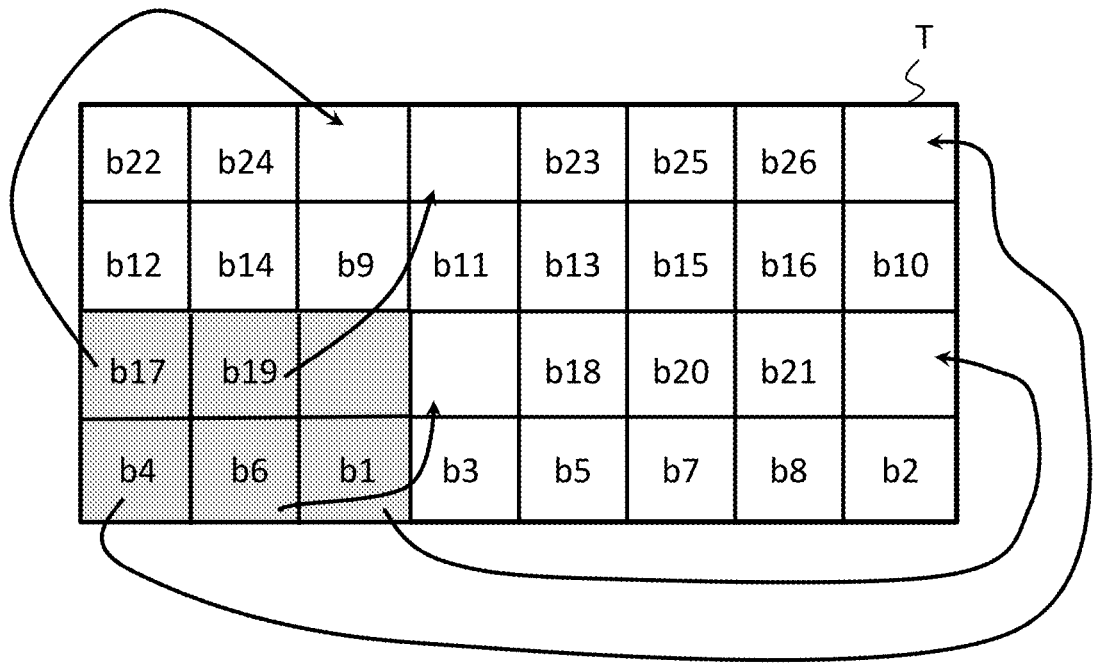
FIG. 6 illustrates processing (moving) of interleaved bits in the first table already shown in FIG. 3, FIG. 4 and FIG. 5, according to one embodiment.

FIG. 6 illustrates movements of bits from invalid positions in the first interleaving table T to valid positions, that is to say positions contained in one of the second interleaving tables T1 and T2. These movements of bits are symbolized by arrows.

According to one embodiment, these movements are performed by running through the invalid positions of the table T' from top to bottom and from left to right. As soon as an invalid position contains a bit bi, said bit is moved to the first encountered available valid position by running through the first interleaving table T from top to bottom and from left to right. The upper part of FIG. 6 illustrates the movements of the bits thus performed, and the lower part of FIG. 6 illustrates the respective positions of the bits at the end of this processing (movements).

Cleverly, each of the second interleaving tables T1 and T2 comprises a group of bits of data distributed into groups each corresponding to a separate frequency band contained in the extended frequency band. In other words and according to the described example, the bits contained in the second interleaving table T1 are transmitted to the first modulator with a view to transmission in BPSK mode in a first separate frequency band of the extended band, and the bits contained in the second interleaving table T2 are transmitted to the second modulator with a view to transmission in QPSK mode in a second separate frequency band of the extended band. Each of the columns of the second interleaving tables corresponds to a subcarrier of the frequency band assigned to the group of data. The interleaving thus also distributes the data in each group onto the various subcarriers of the frequency band used to transmit the data in the group.

According to one embodiment, the bits are respectively transmitted by way of serial flows to the modulators, via buffer memory areas (also called buffers or registers). According to one variant, the bits are in fact transmitted to input buffers respectively associated with the modulators, the input buffers of the modulators directly being the second interleaving tables T1 and T2.

Figure 7:
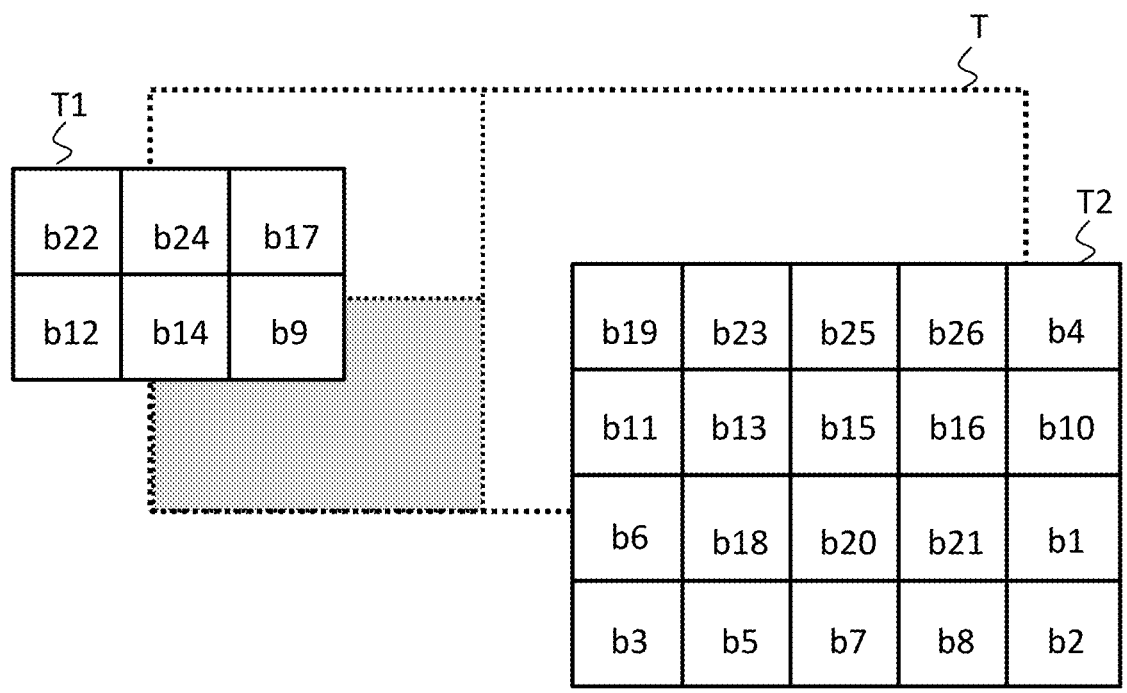
FIG. 7 illustrates a breakdown of the first table, already shown, into second interleaving tables so as to create groups of data, according to one embodiment.

FIG. 7 illustrates the distribution into groups of the first interleaving table T into two second interleaving tables T1 and T2 after the operations of interleaving and processing (moving) the bits present at invalid positions, where applicable. This breakdown advantageously corresponds to the end of the interleaving that is useful to distributing the data to be transmitted in the extended frequency band into the two separate frequency bands used according to the described example.

The illustrated breakdown of the first interleaving table T into two second interleaving tables T1 and T2, at the end of the interleaving, constitutes directing of the data in the form of bits of each of the groups of data (therefore of each of the second interleaving tables T1 and T2) to electronic circuitry configured so as to modulate and transmit the bits. The electronic circuitry dedicated to each of the separate frequency bands in particular comprises the modulator operating so as to transmit in this separate frequency band.

Although the embodiment described above illustrates a transmission in an extended frequency band comprising two separate frequency bands, the reasoning is similar with regard to a distribution of data to be transmitted into three, four or even more separate frequency bands. The first (largest) interleaving table T thus comprises the same number of second interleaving tables T1, T2, Ti as there are separate frequency bands contained in the extended frequency band. According to one preferred embodiment, the second interleaving tables T1, T2, Ti, the respective dimensions of which are defined depending on the modulation type used on each of the separate frequency bands contained in the extended frequency band, are concatenated such that the table that comprises the lowest subcarriers is positioned on the left in the first interleaving table T, and the table that comprises the highest subcarriers is positioned on the right in the first interleaving table. Any intermediate second interleaving tables are arranged from left to right, in ascending order of frequency of the subcarriers that they comprise. Furthermore, the first rows of each of the second tables T1, T2, Ti are aligned with the top first row of the first interleaving table T.

Of course, the matrix-like depiction of the interleaving tables T, T1, T2 and of the table T' are intended to simplify understanding of the layout of the data for the described interleaving operations, and each of the tables could be depicted in the form of a vector of bits, for example a horizontal or vertical one, comprising segments defining the rows and columns described above. The depiction of the positions of the processed bits may be arbitrary, where the operations performed on the bits correspond to the interleaving principles described above. Specifically, the positions of the bits in the tables conventionally correspond to cells of registers or a random access memory of electronic interleaving circuitry.

Figure 8:
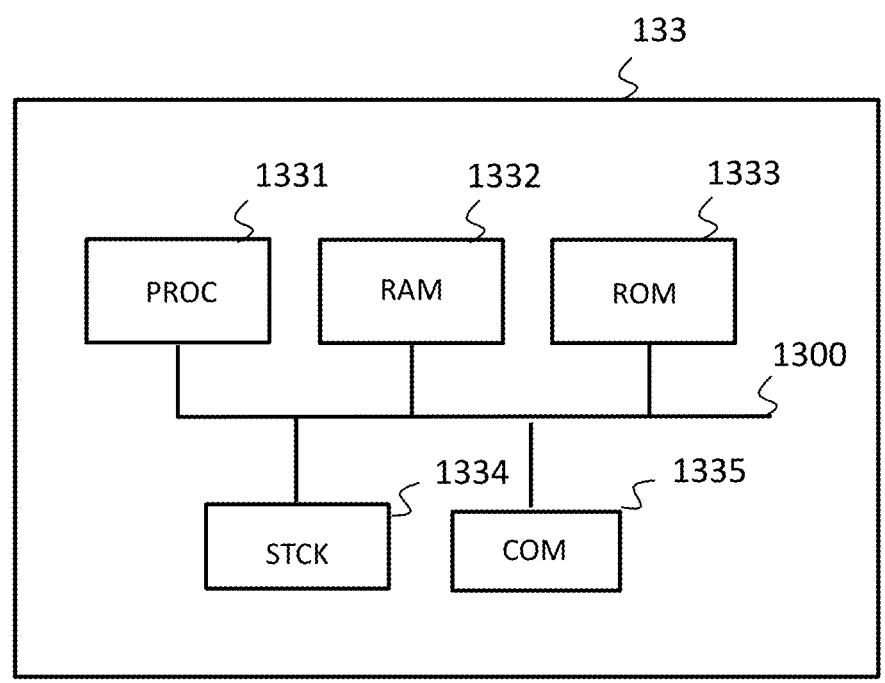
FIG. 8 is a schematic depiction of the architecture of a node device configured so as to carry out the data transmission method represented in FIG. 2.

FIG. 8 schematically illustrates an exemplary internal architecture of any node device of the communication network 120. It will be considered by way of illustration that FIG. 8 illustrates an internal layout of the first node device 133. Such a node device is said to be multi-band since it is capable of transmitting a message on a plurality of frequency bands. It will be noted that FIG. 8 could also schematically illustrate an exemplary hardware architecture of a processing module contained within the first node device 133, such as interleaving circuitry (also called interleaver).

According to the exemplary hardware architecture shown in FIG. 8, the first node device 133 then comprises the following, connected by a communication bus 1300: a processor or CPU ("Central Processing Unit") 1331; a RAM ("Random Access Memory") 1332; a ROM ("Read Only Memory") 1333; a storage unit such as a hard disk (or a storage medium reader, such as an SD ("Secure Digital") card reader 1334; at least one communication interface 1335 allowing the first node device 133 to communicate with the node devices belonging to its network neighbourhood, such as for example the node devices 134 and 137.

The processor 1301 is capable of executing instructions loaded into the RAM 1332 from the ROM 1333, from an external memory (not shown), from a storage medium (such as an SD card), or from a communication network. When the first node device 133 is turned on, the processor 1331 is capable of reading instructions from the RAM 1332 and executing them. These instructions form a computer program that causes the processor 1331 to implement all or some of the method described with reference to FIGS. 2 to 7.

All or some of the method described with reference to FIGS. 2 to 7 may be implemented in software form by executing a set of instructions using a programmable machine, for example a DSP ("Digital Signal Processor") or a microcontroller, or be implemented in hardware form by a machine or a dedicated component, for example an FPGA ("Field-Programmable Gate Array") or an ASIC ("Application-Specific Integrated Circuit"). In general, the first node device 133 comprises electronic circuitry configured so as to implement the methods described with reference to the first node device 133 (likewise the second node device 134). Of course, the first node device 133 furthermore comprises all of the elements that are usually present in a system comprising a control unit and its peripherals, such as a power supply circuit, a power supply monitoring circuit, one or more clock circuits, a reset-to-zero circuit, input/output ports, interrupt inputs and bus drivers, this list not being exhaustive.

The method is particularly advantageous in the context of a G3-PLC meshed network for increasing communication performance between node devices of such a network.

The invention claimed is:

1. A method for transmitting data in a power line communication network, the method being executed in a first node device of said network configured so as to communicate in a plurality of separate frequency bands with a second node device of said network, wherein the first node device applies a transmission mode for transmitting by referring to a single extended frequency band comprising at least two frequency bands from among said plurality of separate frequency bands, each separate frequency band comprising a plurality of subcarriers, the method comprising the following steps:
distributing data to be transmitted in said single extended frequency band into a plurality of groups of data via an interleaving operation, each group being assigned to just one of said at least two separate frequency bands, and data in each of the groups being assigned to each of the subcarriers of the frequency band to which the group is assigned,
transmitting the data in each of the plurality of groups of data in the separate frequency band to which the group is assigned such that the data transmission is carried out jointly on all of the subcarriers of the at least two frequency bands.

2. The method according to claim 1, wherein said at least two separate frequency bands are from among the following group: CENELEC A frequency band, CENELEC B frequency band, and FCC frequency band or ARIB frequency band.

3. The method according to claim 1, wherein the data interleaving operation comprises:
obtaining a first interleaving table T [m, n] of bits representative of the data to be transmitted, the first interleaving table comprising the same number of second interleaving tables Ti [mi, ni] of bits as there are separate frequency bands contained in the extended band, each second interleaving table Ti [mi, ni] being assigned to just one of the at least two separate frequency bands of the extended frequency band, the dimensions mi, ni of each of the second interleaving tables Ti [mi, ni] being defined in accordance with a modulation type used for the transmission of the data in the separate frequency band to which a second interleaving table is assigned, any differences in dimensions between second interleaving tables being liable to generate one or more positions that are said to be invalid, contained in the first interleaving table but not contained in at least one of the second interleaving tables,
interleaving the bits by successively shifting the rows m and columns n of the first interleaving table T [m, n], the successive shifts being performed in the form of circular permutations of the bits respectively by row and by column,
moving any bit detected as being present at an invalid position of the first interleaving table to a position of a said second interleaving table that is available following the interleaving of the bits of the first interleaving table, such that each second interleaving table comprises bits assigned to one of said groups of data,
directing the bits of each of the groups of data to electronic circuitry configured so as to modulate and transmit said bits.

4. The method according to claim 1, wherein the step for interleaving the bits and the dimensions of the second interleaving tables are in accordance with the ITU-T G.9903 recommendation.

5. The method according to claim 1, wherein said power line communication network is a G3-PLC meshed network.

6. A node device intended to be used in a power line communication network, the node device being configured so as to communicate in a plurality of separate frequency bands with a second node device of said network and so as to apply a transmission mode for transmitting by referring to a single extended frequency band comprising at least two frequency bands from among said plurality of separate frequency bands, each separate frequency band comprising a plurality of subcarriers, the node device comprising electronic circuitry configured so as to:

distribute data to be transmitted in said single extended frequency band into a plurality of groups of data via an interleaving operation, each group being assigned to just one of said at least two separate frequency bands, and data in each of the groups being assigned to each of the subcarriers of the frequency band to which the group is assigned, transmit the data in each of the plurality of groups of data in the separate frequency band to which the group is assigned such that the data transmission is carried out jointly on all of the subcarriers of the at least two frequency bands.

7. The node device according to claim 6, wherein said at least two separate frequency bands are from among the following group: CENELEC A frequency band, CENELEC B frequency band, and FCC frequency band or ARIB frequency band, and wherein the dimensions of the second interleaving tables are in accordance with the ITU-T G.9903 recommendation.

8. A power line communication network comprising a plurality of node devices according to claim 6.

9. A non-transitory information storage medium embodying a computer program product, wherein the computer program product comprises program code instructions for performing the steps of the method according to claim 1, when said program is executed by a processor of a node device.

* * * * *